United States Patent [19]
Winkley et al.

[11] 3,868,558
[45] Feb. 25, 1975

[54] BATTERY CHARGING SYSTEMS

[75] Inventors: Albert William Winkley, Hadley; David Gordon Williams, Birmingham, both of England

[73] Assignee: The Lucas Electrical Company Limited, Birmingham, England

[22] Filed: Oct. 11, 1973

[21] Appl. No.: 405,433

[30] Foreign Application Priority Data
Nov. 10, 1972 Great Britain..................... 46775/72

[52] U.S. Cl....................... 320/12, 320/37, 320/64, 320/68, 322/28
[51] Int. Cl. ............................................. H02j 7/14
[58] Field of Search ............ 320/10, 12, 64, 68, 37, 320/38; 322/28

[56] References Cited
UNITED STATES PATENTS

| | | | |
|---|---|---|---|
| 2,802,164 | 8/1957 | Staggs.................................. | 320/12 |
| 3,296,516 | 1/1967 | Paine, II et al. .................. | 320/64 X |
| 3,453,527 | 7/1969 | Nolan .................................. | 322/28 |
| 3,716,774 | 2/1973 | Lace ..................................... | 320/64 |

*Primary Examiner*—J. D. Miller
*Assistant Examiner*—Robert J. Hickey
*Attorney, Agent, or Firm*—Holman & Stern

[57] ABSTRACT

A battery charging system, particularly for a road vehicle, senses when there is a net discharge of the battery. When this happens, the charging level of the battery is increased for a predetermined period of time.

3 Claims, 1 Drawing Figure

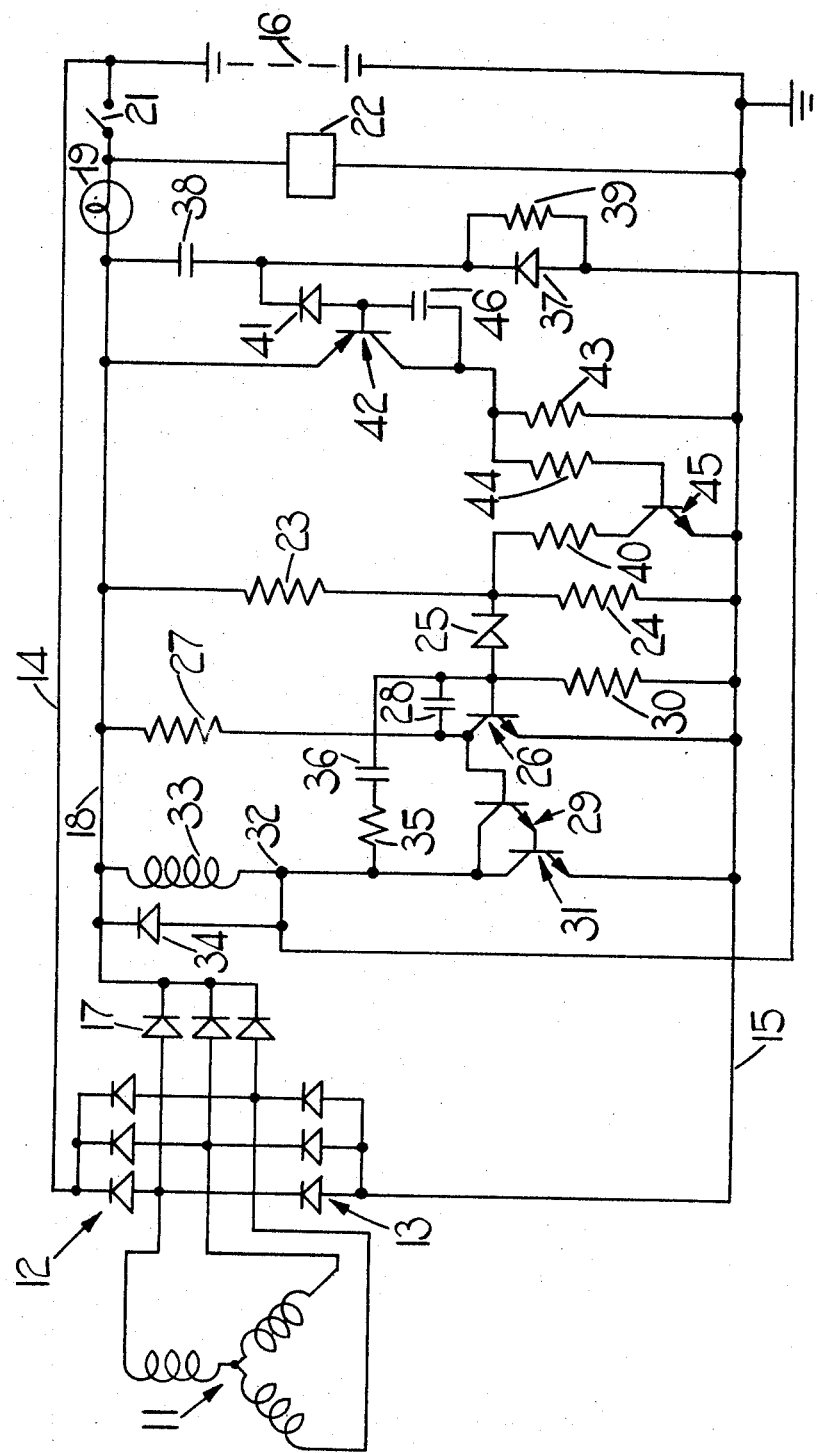

BATTERY CHARGING SYSTEMS

This invention relates to battery charging systems, more particularly for use in road vehicles.

In one aspect, the invention resides in a battery charging system including a generator charging a battery under the control of a voltage regulator, in which the charging level is increased for a period of time following a condition of discharge of the battery.

In another aspect, the invention resides in a battery charging system comprising in combination a generator charging the battery, a voltage regulator controlling the output of the generator, said voltage regulator permitting charging of the battery to the first predetermined level, a sensing network serving to detect net discharge of the battery, and means whereby said sensing network serves when said net discharge ceases to increase the voltage to which the battery is charged for a predetermined period of time.

Preferably, the net discharge of the battery is detected by sensing when the generator is being operated at full power.

Preferably, the generator is a wound field alternator and the voltage regulator is a switching regulator controlling the mean current flow in the field winding of the alternator, the sensing network detecting when the mark-space ratio of the regulator is infinite so that full power is being applied to the field winding.

In another aspect, the invention resides in a voltage regulator for use in a battery charging system, the regulator including first and second input lines, the voltage between which is to be maintained at a predetermined level, a resistance chain connected between said lines, an input transistor coupled to said resistance chain by means of a Zener diode, said input transistor conducting when the voltage between the input lines reaches a first predetermined value, an output transistor connected between one of the input lines and an output terminal, the field winding of a generator being connected in use between said output terminal and the other supply line, and means coupling the input and output transistors so that when the Zener diode conducts, the regulator oscillates with a mark-space ratio determined by the current flowing through the Zener diode, the regulator further incorporating means sensitive to the potential at said output terminals when the Zener diode is non-conductive for increasing the required potential between the supply lines to turn the Zener diode on again.

The invention is particularly concerned with road vehicle battery charging systems, and in such systems it is usual to set the charging voltage of the battery, in a 12 volt system, at about 14.2 volts. With such an arrangement, there will be driving conditions in which the output of the generator will be insufficient to supply all the loads of the battery, so that there will be a net discharge of the battery. It is not practical to overcome this problem by providing a larger generator, and so it is necessary to ensure that the battery recovers quickly at the termination of the net discharge. However, the restriction on the voltage to which the battery is charged imposes a limitation on the time of recovery of the battery, although of course the time could be reduced considerably by increasing the voltage to which the battery is charged. However, a permanent increase in the charging voltage would lead to loss of electrolyte and overcharging of the battery, which would damage the battery. The invention overcomes this problem by increasing the charging rate only for a predetermined period of time following a net discharge of the battery.

The accompanying drawing is a circuit diagram illustrating one example of the invention.

Referring to the drawing, a road vehicle includes a three phase alternator 11 which provides power through two sets of diodes 12, 13 to positive and negative supply lines 14, 15 respectively, the battery 16 of the vehicle being connected between the lines 14, 15 and the line 15 being earthed. The alternator also provides power through a further set of diodes 17 to a positive supply line 18 which is connected to the line 14 through an ignition warning lamp 19 and the ignition switch 21 of the vehicle in series. The junction of the ignition switch 21 and the lamp 19 is connected to the line 15 through ignition controlled loades 22 on the vehicle.

Connected in series between the lines 18, 15 are a pair of resistors 23, 24 the junction of which is connected through a Zener diode 25 to the base of an n-p-n transistor 26 having its emitter connected to the line 15 and its collector connected through a resistor 27 to the line 18. The emitter and base of the transistor 26 are bridged by a resistor 30, and the collector and base of the transistor 26 are bridged by a capacitor 28 which minimises radio interference, and the collector of the transistor 26 is further connected to the base of an n-p-n transistor 29, the emitter of which is connected to the base of an n-p-n transistor 31 having its emitter connected to the line 15. The collectors of the transistors 29, 31 are connected to a terminal 32 which is coupled to the line 18 through the field winding 33 of the alternator. The field winding 33 is bridged by a recirculating diode 34, and the collectors of the transistors 31 and 29 are further connected to the base of the transistor 26 through a resistor 35 and a capacitor 36 in series.

The terminal 32 is further connected through a diode 37 and a capacitor 38 in series to the line 18, the diode 37 being bridged by a resistor 39. The junction of the capacitor 38 and diode 37 is connected through a diode 41 to the base of a p-n-p transistor 42, the emitter of which is connected to the line 18 and the collector of which is connected to the line 15 through a resistor 43, and is further connected through a resistor 44 to the base of an n-p-n transistor 45 has its emitter connected to the line 15 and its collector connected through a resistor 40 to the junction of the resistors, 23, 24, and the base-collector of the transistor 42 is bridged by a capacitor 46.

The system consists basically of the alternator 11 which charges the battery 16 under the control of the voltage regulator incorporating the transistors 26, 29 and 31. The transistors 42 and 45 modify the action of the voltage regulator, but for the moment the operation of these transistors and their associated components will be ignored.

When the ignition switch 21 is first closed, current flows from the battery 16 by way of the switch 21, the lamp 19 and the voltage regulator to the line 15, so that the lamp 19 is illuminated. However, as soon as the alternator 11 produces an output, the potential of the line 18 becomes substantially equal to the potential of the line 14, and so the lamp 19 is extinguished, and the voltage regulator is fed by the line 18.

The voltage of the battery 16 is sensed by the resistance chain 23, 24, and although this chain is shown connected to the line 18, it may in practice be connected directly to the positive terminal of the battery 16. When the battery voltage is below a predetermined value, the Zener diode 25 is non-conductive and the transistor 26 is off, so that the transistors 29 and 31 are on and full field current is supplied to the alternator. Above the predetermined value, however, the Zener diode 25 conducts to turn on the transistor 26 which removes base current from the transistors 29 and 31. By virtue of the positive feedback circuit through the resistor 35 and the capacitor 36, the voltage regulator oscillates between one state with the transistors 31 and 29 on and the transistor 26 off, and another state with the transistors 31 and 29 off and the transistor 26 on. When the transistors 31 and 29 are off, energy stored in the winding 33 is dissipated by way of the diode 34, and so the circuit maintains a mean current flow in the winding 33 which holds the battery voltage at the required level.

As long as the alternator 11 is producing an output sufficient to meet the requirements of the ignition loads 22 and any other loads on the battery 16, then the battery voltage will be at a level such that the Zener diode 25 is conducting, and the regulated voltage is determined by the current flowing through the Zener diode 25. Typically, in a 12 volt system the regulator is set to charge the battery 16 at 14.2 volts. However, if at any time the current supplied by the alternator 11 is less than that demanded, then there will be a net discharge of the battery 16, and in these circumstances the potential between the lines 18, 15 will fall to a value such that the Zener diode 25 no longer conducts, and the transistors 29 and 31 are fully on. In these conditions, the winding 33 is fully energised, and the regulator can be said to be operating with an infinite mark-space ratio. The purpose of the transistors 42 and 45 and their associated components is to sense the net discharge of the battery, and to modify the regulated voltage by increasing it for a predetermined period of time after the battery has experienced a net discharge.

In normal operation with the battery not discharging, then the transistor 31 is alternately conductive and non-conductive. When the transistor is conductive, current flows from the line 18 through the capacitor 38, the resistor 39 and the transistor 31 to charge the capacitor 38. However, when the transistor 31 turns off, then the capacitor 38 discharges rapidly through the diode 37. The arrangement is such that as long as the Zener diode 25 is conducting, so that the regulator is oscillating, the capacitor 38 will never charge sufficiently to enable the transistor 42 to be turned on. In these circumstances, the transistors 42 and 45 play no part in the operation of the circuit. However, if the battery experiences a net discharge, then the Zener diode 25 ceases to conduct as previously explained, and the transistor 31 is on for a substantial period of time. In these circumstances, the capacitor 38 charges sufficiently to permit current flow from the base of the transistor 42 through the diode 41 and resistor 39. This current consists of two components, namely the emitter-base current of the transistor 42 and the discharge current of the capacitor 46. The arrangement is such that the voltage at the collector of the transistor 42 rises linearly until the transistor 42 saturates, at which point the transistor 45 also saturates. Conduction of the transistor 45 modifies the resistance value between the junction of the resistors 23, 24 and the line 15, by virtue of the resistor 40, so increasing the voltage to which the battery will be charged under the control of the voltage regulator. Typically, the value increased from 14.2 volts to 14.8 volts.

Conduction of the transistor 45 will have no effect on the operation of the system as long as the battery is still discharging, but when the alternator starts to charge the battery again, the Zener diode 25 will not conduct at 14.2 volts, but at 14.8 volts by virtue of conduction of the transistor 45. Thus, the transistor 31 will remain conductive to provide full excitation of the alternator until the potential reaches 14.8 volts. When the Zener diode 25 conducts at 14.8 volts, then the transistor 31 will be turned off and the regulator will oscillate in the usual way. As soon as the transistor 31 turns off, the action of the diodes 37 and 41 and the capacitor 38 disconnects the resistor 39 from the transistor 32, and at this point base current is applied to the transistor 42 by the charging current of the capacitor 46. The resistors 39, 43 and 44 are chosen to make the discharge of the capacitor 46 rapid, and is recharged relatively slower. Thus, the transistors 42, 45 are held on by the capacitor 46 for a predetermined period of time. During this time, the transistor 45 will at first be saturated, so that the battery is regulated at 14.8 volts, but during the latter part of the period, the transistor 45 will start to come out of saturation, so that the voltage will gradually decrease from 14.8 volts to the usual value of 14.2 volts. Typically the value of the resistor 44 is chosen to cause the transistor 45 to become saturated when the capacitor 46 is approximately 50% charged.

It will be appreciated that the transistors 42 and 45 and their associated components can be part of the voltage regulator, or can be a separate unit which is coupled to the voltage regulator and the remainder of the system. It is in fact quite simple to convert an existing regulator to the regulator shown, because a normal voltage regulator has terminals corresponding to the lines 18 and 15, and a field terminal corresponding to the terminal 32. The arrangement shown can of course be employed in conjunction with a temperature-sensing device, in which case the regulated voltage will not only vary with temperature under the control of the device, but also with the state of the battery 16 in the manner explained above.

It is not essential to sense the net discharge of the battery in the manner shown. For example, the current flow to the battery could be measured and compared with the current flow from the battery to indicate when the battery is discharging. Alternatively, means could be provided for detecting when the system voltage falls below the regulator setting, and elevating the regulator setting subsequently. If desired, the time for which the discharge took place could be measured, and used to influence the time for which the elevated charging is permitted. However, care must be taken to ensure that the battery does not become overcharged.

In the arrangement described, following a net discharge of the battery, the regulator setting is elevated, and the battery is charged to the elevated value, for a period of time by virtue of the capacitor 46.

We claim:

1. A battery charging system comprising in combination a generator charging the battery, said generator having a field winding, a voltage regulator coupled to the battery and controlling the output of the generator by switching the circuit to said field winding at a mark-space ratio determined by the voltage of the battery, said voltage regulator permitting charging of the battery to a first predetermined level, a sensing network serving to detect said mark-space ratio, and means whereby said sensing network serves when said mark-space ratio is infinite to increase the voltage to which the battery is charged for a predetermined period of time.

2. A battery charging system comprising in combination a generator charging the battery, said generator having a field winding, a voltage regulator coupled to the battery and controlling the output of the generator by switching the circuit to said field winding at a mark-space ratio determined by the voltage of the battery, said voltage regulator permitting charging of the battery to a first predetermined level, a sensing network serving to detect said mark-space ratio, said sensing network including a capacitor which is alternately charged and discharged by the voltage regulator except when the mark-space ratio is infinite, a switching arrangement coupled to the capacitor, said switching arrangement being operative when the mark-space ratio is infinite to increase the voltage to which the battery is charged for a predetermined period of time.

3. A voltage regulator for use in a battery charging system, the regulator including first and second input lines, the voltage between which is to be maintained at a predetermined level, a resistance chain connected between said lines, an input transistor coupled to said resistance chain by means of a Zener diode, said input transistor conducting when the voltage between the input lines reaches a first predetermined value, an output transistor connected between one of the input lines and an output terminal, the field winding of a generator being connected in use between said output terminal and the other supply line, and means coupling the input and output transistors so that when the Zener diode conducts, the regulator oscillates with a mark-space ratio determined by the current flowing through the Zener diode, the regulator further incorporating means sensitive to the potential at said output terminals when the Zener diode is non-conductive for increasing the required potential between the supply lines to turn the Zener diode on again.

* * * * *